United States Patent
Geiss et al.

(10) Patent No.: US 9,117,134 B1
(45) Date of Patent: Aug. 25, 2015

(54) IMAGE MERGING WITH BLENDING

(71) Applicant: Google Inc., Mountain View, CA (US)

(72) Inventors: Ryan Geiss, Mountain View, CA (US); Samuel William Hasinoff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 13/847,238

(22) Filed: Mar. 19, 2013

(51) Int. Cl.
*G06K 9/32* (2006.01)

(52) U.S. Cl.
CPC .......... *G06K 9/32* (2013.01); *G06T 2207/10004* (2013.01); *G06T 2207/10144* (2013.01)

(58) Field of Classification Search
USPC ............ 382/294, 284, 276, 164, 103; 348/43, 348/241, 242; 345/418, 419, 430, 619, 629
See application file for complete search history.

(56) References Cited

U.S. PATENT DOCUMENTS

| | | | |
|---|---|---|---|
| 4,644,582 A | 2/1987 | Morishita et al. | |
| 5,781,308 A | 7/1998 | Fujii et al. | |
| 5,828,793 A | 10/1998 | Mann | |
| 5,926,190 A | 7/1999 | Turkowski et al. | |
| 6,061,091 A | 5/2000 | Van de Poel et al. | |
| 6,075,905 A | 6/2000 | Herman et al. | |
| 6,101,285 A | 8/2000 | Fan | |
| 6,204,881 B1 | 3/2001 | Ikeda et al. | |
| 6,539,116 B2 | 3/2003 | Takaoka | |
| 6,693,718 B1 | 2/2004 | Takaoka | |
| 6,925,121 B1 | 8/2005 | Komiya et al. | |
| 6,975,755 B1 | 12/2005 | Baumberg | |
| 7,098,946 B1 | 8/2006 | Koseki et al. | |
| 7,173,666 B1 | 2/2007 | Masaki et al. | |
| 7,239,805 B2 | 7/2007 | Uyttendaele et al. | |
| 7,626,614 B1 | 12/2009 | Marcu | |
| 7,667,764 B2 | 2/2010 | Kamon et al. | |
| 7,840,093 B2 | 11/2010 | Fu et al. | |
| 7,903,168 B2 | 3/2011 | Pillman et al. | |
| 7,924,321 B2 | 4/2011 | Nayar et al. | |
| 7,940,325 B2 | 5/2011 | Kim et al. | |
| 7,944,485 B2 | 5/2011 | Ovsiannikov | |

(Continued)

FOREIGN PATENT DOCUMENTS

| | | |
|---|---|---|
| JP | 2005-045804 | 2/2005 |
| JP | 2012-029029 | 2/2012 |

(Continued)

OTHER PUBLICATIONS

International Searching Authority, International Search Report and Written Opinion for International Application No. PCT/US2014/038963 mailed Sep. 17, 2014, 12 pages.

(Continued)

*Primary Examiner* — Yon Couso
(74) *Attorney, Agent, or Firm* — McDonnell Boehnen Hulbert & Berghoff LLP

(57) ABSTRACT

A base m×n tile, X, of a base image of a scene, and an alternate m×n tile, Y, of an alternate image of the scene may be obtained. An m×n blend map, B, for X and Y may also be obtained. B(i,j) may take on a first value to refer to X(i,j), or a second value to refer to Y(i,j). An m×n conflict map, C, for X and Y may further be obtained. C(i,j) may take on a third value where X(i,j) and Y(i,j) are within a threshold value of one another, or a fourth value where X(i,j) and Y(i,j) are not within the threshold value of one another. Based on B and C, the pixel values of X and Y may be merged to form an m×n tile Z.

20 Claims, 8 Drawing Sheets

(56) References Cited

U.S. PATENT DOCUMENTS

| | | | |
|---|---|---|---|
| 8,023,004 | B2 | 9/2011 | Asoma |
| 8,059,891 | B2 | 11/2011 | Li et al. |
| 8,072,507 | B2 | 12/2011 | Fuh et al. |
| 8,094,211 | B2 | 1/2012 | Kwon et al. |
| 8,200,020 | B1 | 6/2012 | Geiss et al. |
| 8,208,048 | B2 | 6/2012 | Lin et al. |
| 8,237,813 | B2 | 8/2012 | Garten |
| 8,406,560 | B2 | 3/2013 | Lee et al. |
| 8,411,962 | B1 | 4/2013 | Geiss et al. |
| 8,446,481 | B1 | 5/2013 | Geiss et al. |
| 8,576,295 | B2 | 11/2013 | Ito |
| 8,866,927 | B2 | 10/2014 | Levoy et al. |
| 8,866,928 | B2 | 10/2014 | Geiss |
| 8,885,976 | B1 * | 11/2014 | Kuo et al. ............... 382/276 |
| 2001/0019362 | A1 | 9/2001 | Nakamura et al. |
| 2003/0002750 | A1 | 1/2003 | Ejiri et al. |
| 2003/0095192 | A1 | 5/2003 | Horiuchi |
| 2004/0160525 | A1 | 8/2004 | Kingetsu et al. |
| 2005/0147322 | A1 | 7/2005 | Saed |
| 2005/0163380 | A1 | 7/2005 | Wang et al. |
| 2005/0239104 | A1 | 10/2005 | Ferea et al. |
| 2005/0243176 | A1 | 11/2005 | Wu et al. |
| 2006/0269155 | A1 | 11/2006 | Tener et al. |
| 2006/0291740 | A1 | 12/2006 | Kim et al. |
| 2007/0003261 | A1 | 1/2007 | Yamasaki |
| 2007/0147824 | A1 | 6/2007 | Hamamura |
| 2008/0094486 | A1 | 4/2008 | Fuh et al. |
| 2008/0253758 | A1 | 10/2008 | Yap et al. |
| 2008/0278633 | A1 | 11/2008 | Tsoupko-Sitnikov et al. |
| 2008/0298717 | A1 | 12/2008 | Lee |
| 2009/0040364 | A1 | 2/2009 | Rubner |
| 2009/0123082 | A1 | 5/2009 | Atanssov et al. |
| 2009/0185622 | A1 | 7/2009 | Itoh et al. |
| 2009/0207258 | A1 | 8/2009 | Jang et al. |
| 2009/0222625 | A1 | 9/2009 | Ghosh et al. |
| 2009/0231445 | A1 | 9/2009 | Kanehiro |
| 2009/0231449 | A1 | 9/2009 | Tzur et al. |
| 2009/0231468 | A1 | 9/2009 | Yasuda |
| 2009/0244301 | A1 | 10/2009 | Border et al. |
| 2009/0268963 | A1 | 10/2009 | Kang et al. |
| 2009/0274387 | A1 | 11/2009 | Jin |
| 2009/0322901 | A1 | 12/2009 | Subbotin et al. |
| 2010/0066858 | A1 | 3/2010 | Asoma |
| 2010/0103194 | A1 | 4/2010 | Chen et al. |
| 2010/0150473 | A1 | 6/2010 | Kwon et al. |
| 2010/0157078 | A1 | 6/2010 | Atanassov et al. |
| 2010/0165075 | A1 | 7/2010 | Chou et al. |
| 2010/0166337 | A1 | 7/2010 | Murashita et al. |
| 2010/0265357 | A1 | 10/2010 | Liu et al. |
| 2010/0277631 | A1 | 11/2010 | Sugiyama |
| 2010/0321539 | A1 | 12/2010 | Ito |
| 2010/0328490 | A1 | 12/2010 | Kurane et al. |
| 2010/0328491 | A1 | 12/2010 | Ovsiannikov |
| 2011/0047155 | A1 | 2/2011 | Sohn et al. |
| 2011/0069200 | A1 | 3/2011 | Oh et al. |
| 2011/0085697 | A1 | 4/2011 | Clippard et al. |
| 2011/0149111 | A1 | 6/2011 | Prentice et al. |
| 2011/0200265 | A1 | 8/2011 | Prigent |
| 2011/0222793 | A1 | 9/2011 | Ueda et al. |
| 2011/0228993 | A1 | 9/2011 | Reilly et al. |
| 2011/0254976 | A1 | 10/2011 | Garten |
| 2011/0279706 | A1 | 11/2011 | Lesiak et al. |
| 2012/0002082 | A1 | 1/2012 | Johnson et al. |
| 2012/0002898 | A1 | 1/2012 | Cote et al. |
| 2012/0002899 | A1 | 1/2012 | Orr, IV et al. |
| 2012/0044381 | A1 | 2/2012 | Jannard et al. |
| 2012/0050557 | A1 | 3/2012 | Atanassov et al. |
| 2012/0105681 | A1 | 5/2012 | Morales |
| 2012/0127348 | A1 | 5/2012 | Li |
| 2012/0189197 | A1 | 7/2012 | Li et al. |
| 2012/0201426 | A1 | 8/2012 | Jasinski et al. |
| 2012/0201450 | A1 | 8/2012 | Bryant et al. |
| 2012/0201456 | A1 | 8/2012 | El-Mahdy et al. |
| 2012/0219235 | A1 | 8/2012 | Solhusvik et al. |
| 2012/0249828 | A1 | 10/2012 | Sun |
| 2012/0308126 | A1 | 12/2012 | Hwang et al. |
| 2012/0314100 | A1 | 12/2012 | Frank |
| 2013/0033616 | A1 | 2/2013 | Kaizu et al. |
| 2013/0083216 | A1 | 4/2013 | Jiang et al. |
| 2013/0100314 | A1 | 4/2013 | Li et al. |
| 2013/0121569 | A1 * | 5/2013 | Yadav ............... 382/164 |
| 2013/0329092 | A1 | 12/2013 | Wong |
| 2014/0042233 | A1 | 2/2014 | Yang |
| 2014/0219578 | A1 | 8/2014 | Peng et al. |

FOREIGN PATENT DOCUMENTS

| | | |
|---|---|---|
| KR | 10-2007-0085867 | 8/2007 |
| KR | 10-0911814 | 8/2009 |
| KR | 10-2010-0086987 | 8/2010 |
| WO | 98/02844 | 1/1998 |
| WO | 2004/098167 | 11/2004 |
| WO | 2011/093994 | 8/2011 |
| WO | 2011/102850 | 8/2011 |
| WO | 2012/027290 | 3/2012 |
| WO | 2012/039669 | 3/2012 |
| WO | 2012/061261 | 5/2012 |
| WO | 2012/098842 | 7/2012 |
| WO | 2012/110894 | 8/2012 |

OTHER PUBLICATIONS

Office Action for U.S. Appl. No. 13/718,533 mailed Apr. 22, 2014, 48 pages.
Office Action for U.S. Appl. No. 13/863,981 mailed Jun. 24, 2014, 23 pages.
Notice of Allowance for U.S. Appl. No. 13/718,533 mailed Jul. 18, 2014, 9 pages.
Notice of Allowance for U.S. Appl. No. 13/713,720 mailed Jul. 18, 2014, 13 pages.
Office Action for U.S. Appl. No. 13/863,981 mailed Oct. 7, 2013, 45 pages.
Final Office Action, U.S. Appl. No. 13/863,981 mailed Apr. 8, 2014, 26 pages.
Office Action, U.S. Appl. No. 13/713,720, mailed Apr. 8, 2014, 46 pages.
Office Action for U.S. Appl. No. 13/759,749 mailed Sep. 24, 2014, 38 pages.
Office Action for U.S. Appl. No. 13/849,824 mailed Nov. 5, 2014, 14 pages.
International Searching Authority, International Search Report and Written Opinion for PCT/US2013/072638 mailed Mar. 11, 2014, 10 pages.
International Searching Authority, International Search Report and Written Opinion for PCT/US2013/071663 mailed Mar. 13, 2014, 9 pages.
International Searching Authority, International Search Report and Written Opinion for PCT/US2013/72564 mailed Mar. 11, 2014, 13 pages.
International Searching Authority, International Search Report and Written Opinion for PCT/US2013/071459 mailed Mar. 13, 2014, 9 pages.
Notice of Allowance for U.S. Appl. No. 13/305,389 mailed Feb. 22, 2012, 9 pages.
Notice of Allowance for U.S. Appl. No. 13/458,334 mailed Oct. 11, 2012, 34 pages.
Office Action for U.S. Appl. No. 13/902,267 mailed Dec. 12, 2014, 12 pages.
International Searching Authority, International Search Report and Written Opinion for PCT/US2013/071618 mailed Mar. 3, 2014, 9 pages.
International Searching Authority, International Search Report and Written Opinion for PCT/US2013/072569 mailed Mar. 6, 2014, 9 pages.
Jin et al., "Face Detection Using Improved LBP Under Bayesian Framework," Proceedings of the Third International Conference on Image and Graphics (ICIG'04), 2004, pp. 1-4.
Mandava et al., "Speckle Noise Reduction Using Local Binary Pattern," 2nd International Conference on Communication, Computing & Security (ICCCS-2012), Procedia Technology, 2012, pp. 574-581, vol. 6.

(56) References Cited

OTHER PUBLICATIONS

Office Action for U.S. Appl. No. 13/743,565 mailed Sep. 4, 2014, 20 pages.

Office Action for U.S. Appl. No. 13/722,519 mailed Sep. 4, 2014, 10 pages.

Nayar et al., "Adaptive Dynamic Range Imaging: Optical Control of Pixel Exposures Over Space and Time," Proceedings of the Ninth IEEE International Conference on Computer Vision (ICCV'03), 2003, pp. 1-8.

Duan et al., "Tone-mapping High Dynamic Range Images by Novel Histogram Adjustment," Pattern Recognition, 2010, 39 pages, vol. 43, No. 5.

"Exposure (photography)," Wikipedia, the free encyclopedia, Jun. 21, 2012, pp. 1-8 (http://en.wikipedia.org/wiki/Autoexposure#Automatic_exposure).

"JPEG," Wikipedia, the free encyclopedia, Jul. 31, 2012, pp. 1-16 (http://en.wikipedia.org/wiki/JPEG).

"High dynamic range imaging," Wikipedia, the free encyclopedia, Jun. 21, 2012, pp. 1-11 (http://en.wikipedia.org/wiki/High_dynamic_range_imaging).

"Tone mapping," Wikipedia, the free encyclopedia, Jun. 21, 2012, pp. 1-10 (http://en.wikipedia.org/wiki/Tone_mapping).

"Metering mode," Wikipedia, the free encyclopedia, Jun. 25, 2012, pp. 1-3 (http://en.wikipedia.org/wiki/Metering_mode).

"YCbCr," Wikipedia, the free encyclopedia, Jul. 31, 2012, pp. 1-5 (http://en.wikipedia.org/wiki/YCbCr).

Lowe, D.G., "Object Recognition from Local Scale-Invariant Features," Proc. of the International Conference on Computer Vision, Sep. 20-22, 1999, pp. 1150-1157, vol. 2.

Brown, M. & Lowe, D., "Invariant Features from Interest Point Groups," Computer, (2002) p. 253-262, Available at: http://citeseerx.ist.psu.edu/viewdoc/download?doi=10.1.1.73.5616&rep=rep1&type=pdf.

Winder, S.A.J. and Brown, M., "Learning Local Image Descriptors," Computer Vision and Pattern Recognition, 2007. CVPR '07. IEEE Conference on Computer Vision and Pattern Recognition, 2007. CVPR '07. IEEE Conference on (Jun. 2007), pp. 1-8. doi:10.1109/CVPR.2007.382971 Key: citeulike:1663569.

Sinha et al., "Feature Tracking and Matching in Video Using Programmable Graphics Hardware," Machine Vision and Applications, DOI 10.1007/s00138-007-0105-z, Nov. 2007.

Wagner et al., "Pose Tracking from Natural Features on Mobile Phones," Proceeding ISMAR '08 Proceedings of the 7th IEEE/ACM International Symposium on Mixed and Augmented Reality IEEE Computer Society Washington, DC, USA, Sep. 15-18, 2008, pp. 125-134.

Özuysal et al., "Fast Keypoint Recognition in Ten Lines of Code," Computer Vision and Pattern Recognition, IEEE Computer Society Conference on in Computer Vision and Pattern Recognition, 2007. CVPR '07. IEEE Conference on, vol. 0 (2007), pp. 1-8. doi:10.1109/CVPR.2007.383123 Key: citeulike:2943111.

Bay et al., "SURF: Speeded Up Robust Features," 9th European Conference on Computer Vision, 2008, pp. 346-359, vol. 110, No. 3.

Ta, Duy-Nguyen et al., "SURFTrac: Efficient Tracking and Continuous Object Recognition using Local Feature Descriptors," IEEE Computer Society Conference on Computer Vision and Pattern Recognition, 2009, pp. 2937-2944.

Bauer et al., "Comparing Several Implementations of Two Recently Published Feature Detectors," In Proc. of the International Conference on Intelligent and Autonomous Systems, IAV, Toulouse, France (2007).

SIFT, accessed on Oct. 21, 2011, from Wikipedia, http://en.wikipedia.org/w/index.php?title=Special:Book&bookcmd=download&collection_id=1bf75abdad524091&writer=rl&return_to=Scale-invariant+feature+transform.

SURF, accessed on Oct. 24, 2011, from Wikipedia, http://en.wikipedia.org/wiki/SURF.

Wagner et al., "Real-time detection and tracking for augmented reality on mobile phones," IEEE Trans Vis Comput Graph, May-Jun. 2010, pp. 355-368, vol. 16, No. 3.

SynthCam iPhone, https://sites.google.com/site/marclevoy/Tutorial accessed Oct. 24, 2011.

Karpenko et al., "Digital Video Stabilization and Rolling Shutter Correction using Gyroscopes," Stanford Tech Report CTSR Mar. 2011, http://graphics.stanford.edu/papers/stabilization/karpenko_gyro.pdf (Sep. 2011).

Gelfand, Natasha, et al. "Multi-exposure imaging on mobile devices." In Proceedings of the international conference on Multimedia, ACM, 2010, pp. 823-826.

Notice of Allowance for U.S. Appl. No. 13/610,288 mailed Feb. 28, 2013, 31 pages.

Cyganek, Bogusław, "Comparison of nonparametric transformations and bit vector matching for stereo correlation." Combinatorial Image Analysis, 2005, pp. 534-547.

Zabih et al., "Non-parametric Local Transforms for Computing Visual Correspondence," In Proceedings of European Conference on Computer Vision, Stockholm, Sweden, May 1994, pp. 151-158.

Fife, Wade S. et al., "Improved Census Transforms for Resource-Optimized Stereo Vision," IEEE Transactions on Circuits and Systems for Video Technology, Jan. 2013, vol. 23, No. 1, pp. 60-73.

Hansen, Christian et al., "Chapter 1: The Image Deblurring Problem," Deblurring Images: Matrices, Spectra, and Filtering, SIAM, Philadelphia, 2006, pp. 1-12.

Seemann, Torsten et al., "Structure preserving noise filtering of images using explicit local segmentation." Fourteenth International Conference on Pattern Recognition, IEEE, 1998, vol. 2, pp. 1610-1612.

International Search Report and Written Opinion for PCT/US2014/011498 mailed Apr. 22, 2014, 11 pages.

Notice of Allowance for U.S. Appl. No. 13/743,565 mailed Dec. 2, 2014, 15 pages.

Notice of Allowance for U.S. Appl. No. 14/455,444 mailed Oct. 2, 2014, 9 pages.

Office Action for U.S. Appl. No. 13/902,254 mailed Dec. 2, 2014, 9 pages.

Final Office Action for U.S. Appl. No. 13/863,981 mailed Dec. 24, 2014, 21 pages.

Office Action for U.S. Appl. No. 13/713,734 mailed Dec. 24, 2014, 12 pages.

Office Action for U.S. Appl. No. 13/722,519 mailed Feb. 19, 2015, 11 pages.

Office Action for U.S. Appl. No. 14/488,891 mailed Feb. 13, 2015, 6 pages.

\* cited by examiner

IMAGE MERGING WITH BLENDING

BACKGROUND

Generally, imaging may refer to capturing and representing the color and brightness characteristics of digital images (e.g., photographs and motion video). Low dynamic range (LDR) imaging may represent digital images with 8 or fewer bits for each color channel of a pixel. As a result, up to 256 levels of brightness may be supported. Currently, a wide range of video output devices (e.g., computer monitors, tablet and smartphone screens, televisions, etc.) support displaying LDR images.

However, real-world scenes often exhibit a wider range of brightness than can be represented by LDR imaging. As an example scene with a wide brightness range, consider an individual standing in a dark room in front of a window. This scene may include both extremely bright regions (e.g., sunlit features outside the window) and extremely dark regions (e.g., the features in the room). Ideally, an image of this scene would include both the details in the bright regions and the details in the dark regions.

SUMMARY

In some situations, a digital image of a scene may be enhanced by merging it with other digital images of the same scene. For instance, a camera device may capture several images of a scene. One of these images, usually the sharpest, may be chosen as a base image. However, sections of the base image may be blurry, noisy, too dark, or too light. Thus, it may be beneficial to select at least some portions (e.g., m×n tiles) of the other images of the scene to use to enhance corresponding portions (e.g., m×n tiles) of the base image.

Accordingly, in a first example embodiment, a base m×n tile, X, of a base image of a scene, and an alternate m×n tile, Y, of an alternate image of the scene, may be obtained. $X(i,j)$ may represent one or more pixel values of X indexed by i and j, and $Y(i,j)$ may represents one or more pixel values of Y indexed by i and j. X and Y may have been aligned with one another to an extent. An m×n blend map, B, for X and Y may also be obtained. $B(i,j)$ may take on a first value to refer to $X(i,j)$, or a second value to refer to $Y(i,j)$. An m×n conflict map, C, for X and Y may further be obtained. $C(i,j)$ may take on a third value where $X(i,j)$ and $Y(i,j)$ are within a threshold value of one another, or a fourth value where $X(i,j)$ and $Y(i,j)$ are not within the threshold value of one another. Based on B and C, the pixel values of X and Y may be merged to form an m×n tile Z that represents a portion of the scene.

A second example embodiment may include means for obtaining a base m×n tile, X, of a base image of a scene, and an alternate m×n tile, Y, of an alternate image of the scene, wherein $X(i,j)$ represents one or more pixel values of X indexed by i and j, and wherein $Y(i,j)$ represents one or more pixel values of Y indexed by i and j, wherein X and Y have been aligned with one another. The second example embodiment may also include means for obtaining an m×n blend map, B, for X and Y, wherein $B(i,j)$ takes on a first value to refer to $X(i,j)$, and wherein $B(i,j)$ takes on a second value to refer to $Y(i,j)$, and means for obtaining an m×n conflict map, C, for X and Y, wherein $C(i,j)$ takes on a third value where $X(i,j)$ and $Y(i,j)$ are within a threshold value of one another, and wherein $C(i,j)$ takes on a fourth value where $X(i,j)$ and $Y(i,j)$ are not within the threshold value of one another. The second example embodiment may further include means for, based on B and C, merging the pixel values of X and Y to form an m×n tile Z, wherein Z represents a portion of the scene.

A third example embodiment may include a non-transitory computer-readable storage medium, having stored thereon program instructions that, upon execution by a computing device, cause the computing device, and/or its peripherals, to perform operations in accordance with the first and/or second example embodiment.

A fourth example embodiment may include a computing device, comprising at least a processor and data storage. The data storage may contain program instructions that, upon execution by the processor, cause the computing device, and/or its peripherals, to operate in accordance with the first and/or second example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
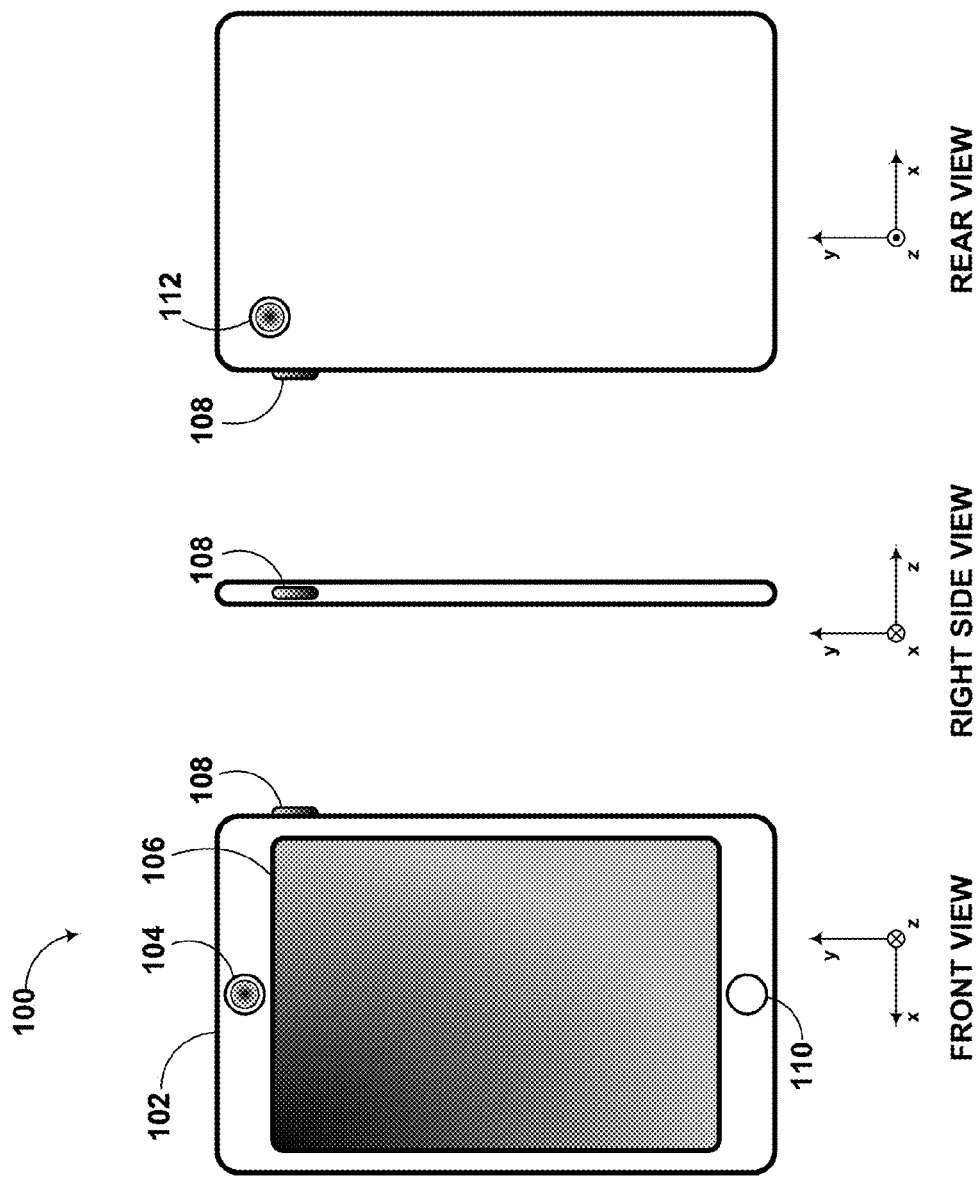
FIG. 1 depicts front, right side, and rear views of a digital camera device, in accordance with an example embodiment.

As image capture devices, such as cameras, become more popular, they may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
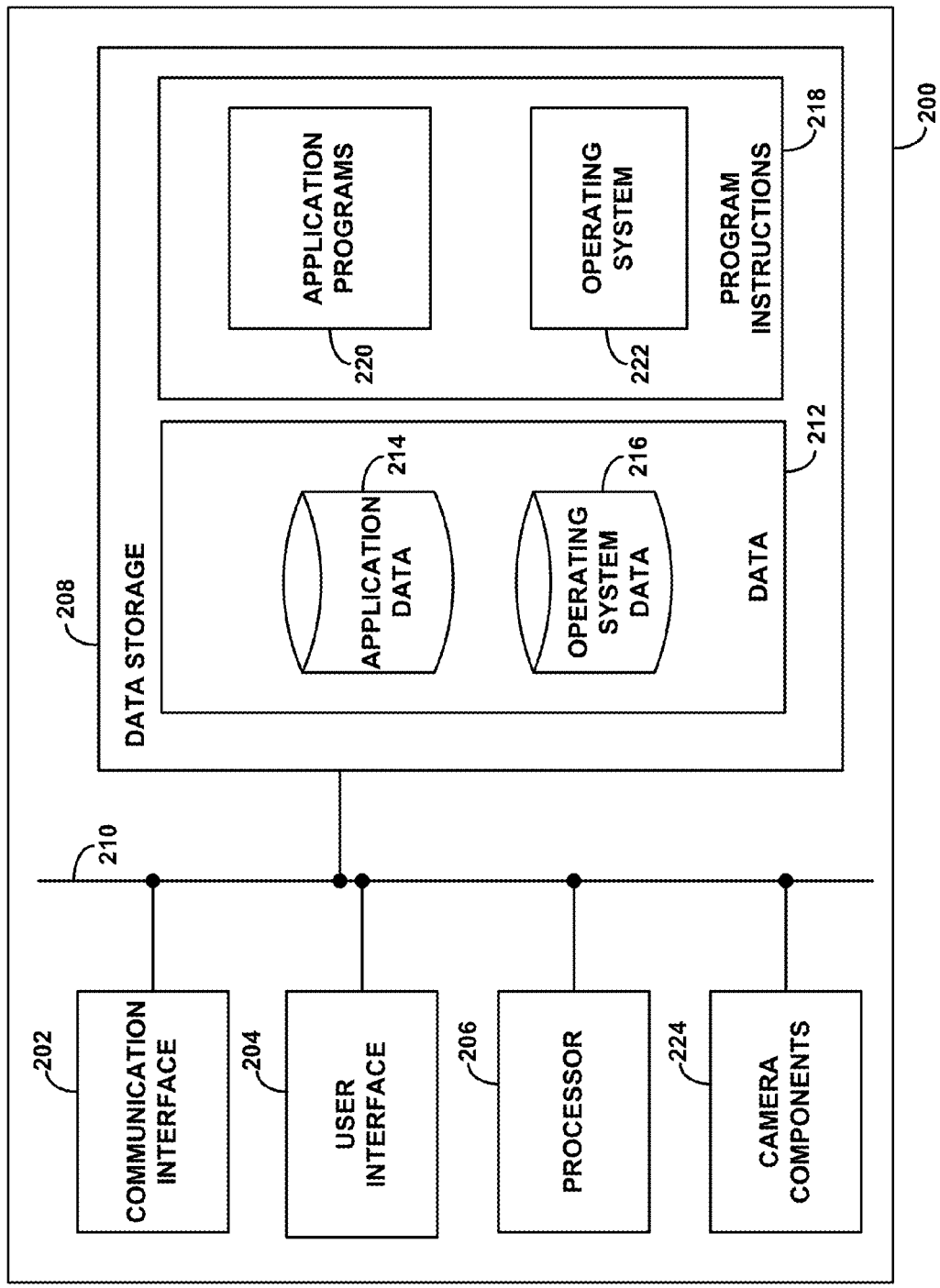
FIG. 2 depicts a block diagram of a computing device with image capture capability, in accordance with an example embodiment.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing so is referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the TET with which the image was captured.

A short TET may result in a reasonably accurate representation of the bright regions of a scene, but underexposure of the dark regions. Conversely, a long TET may result in a reasonably accurate representation of the dark regions, but may overexpose the bright regions. In the example scene introduced above, if the TET is too long, the features in the room may appear properly-exposed, but the features outside the window may appear whitewashed. But if the TET is too short, the features outside the window may appear normal but the features in the room may appear darkened. Either of these outcomes is undesirable. For some scenes, there may not be a single TET that results in a captured image representing the details in both bright regions and dark regions with acceptable detail.

Camera devices may support an auto-exposure (AE) mode in which, prior to output image capture, the camera determines the TET based on the brightness of the scene. For example, the user may observe the scene in the camera's viewfinder before triggering image capture. During this period, the camera may make an initial estimate of the proper TET, capture a preview image with that TET, and then evaluate the pixels in the captured image. Then, as one possible implementation, if a majority (or some other sufficient fraction) of the pixels in the preview image are over-exposed, the camera may decrease the TET and capture another preview image. If a majority (or some other sufficient fraction) of the pixels in this preview image are under-exposed, the camera may increase the TET and capture yet another preview image.

For instance, if the majority of the pixels in the captured image exhibit a brightness value above a high threshold level (e.g., 240), the camera may decrease the TET. On the other hand, if a majority of the pixels exhibit a brightness level below a low threshold level (e.g., 96), the camera may increase the TET.

Alternatively or additionally, a target average pixel value for some or all of the scene's pixels may be determined. If the actual average pixel value is above the target average pixel value, the TET may be decreased, and if the actual average pixel value is below the target average pixel value, the TET may be increased. The target average pixel value can also be tuned differently depending on how much contrast there is in the scene. For example, in a low-contrast scene, the target average pixel value may be bright (e.g., 200). But in a high-contrast scene, the target average pixel value may be lower (e.g., 128). Refining the TET in order to obtain the target scene brightness might be done with actual exposures, or done using synthetic exposures from one or more metering bursts. In some embodiments, a TET may be determined directly from one or more histograms of a scene without the intermediate step of determining a target scene brightness.

This process may continue until the camera determines that an image should be captured and stored (e.g., the user activates the shutter button). During this process, if the characteristics of the scene are relatively unchanging, the camera usually converges on an estimated "best" TET based on the brightness of the scene. In some embodiments, the image displayed on the camera's viewfinder may omit information from one or more of the captured preview images or combine information from two or more of the captured preview images.

In some cases, the camera might not treat all pixels equally when determining an "average" brightness of the scene. Using a technique described as "center-weighted averaging," pixels near the middle of the scene may be considered to be more important. Thus, these pixels may be weighted more than pixels illustrating other areas of the scene. Alternatively, pixels in other locations of an image may be given more weight. For instance, if the camera detects a human face (or some other object of interest) in a particular location other than the center of the image, the camera may give a higher weight to the associated pixels.

In this way, AE algorithms may seek to determine a TET that produces a large number (e.g., the largest number) of properly-exposed pixels. However, given the range limitations of LDR imaging, even images captured in AE mode may contain portions that are whitewashed or darkened. Thus, as noted above, some scenes there may be no single "best" TET.

AE algorithms may differ from the description above. For instance, some may be more complex, treating different colors differently, considering the spatial and/or structural components of a scene, and/or measuring contrast between regions. The embodiments herein, however, may operate with any AE algorithm now known or developed in the future.

High dynamic range (HDR) imaging has been proposed as a way of compensating for the deficiencies of LDR imaging. In a possible implementation, HDR imaging may involve a camera capturing multiple images of a scene at various TETs, and then digitally processing these captured images to make a single image that contains a reasonable representation of the details in most or all regions of the scene, including those that are very bright and very dark. However, determining TETs for capturing images can be problematic. In particular, difficulty in adjusting TETs for a particular scene has created limitations in HDR imaging. The methods and implementations described herein may provide computational efficiency, robustness to artifacts, and/or enhanced image quality.

In the following, the term "LDR image" may refer to an image captured using LDR imaging, and the term "LDR scene" may refer to a scene that has been determined to be reasonably represented using LDR imaging. Similarly, the term "HDR image" may refer to an image captured using HDR imaging, and the term "HDR scene" may refer to a scene that has been determined to be reasonably represented using HDR imaging. Furthermore, the term "LDR imaging" may be used interchangeably with the term "LDR image acquisition," and the term "HDR imaging" may be used interchangeably with the term "HDR image acquisition."

Figure 3:
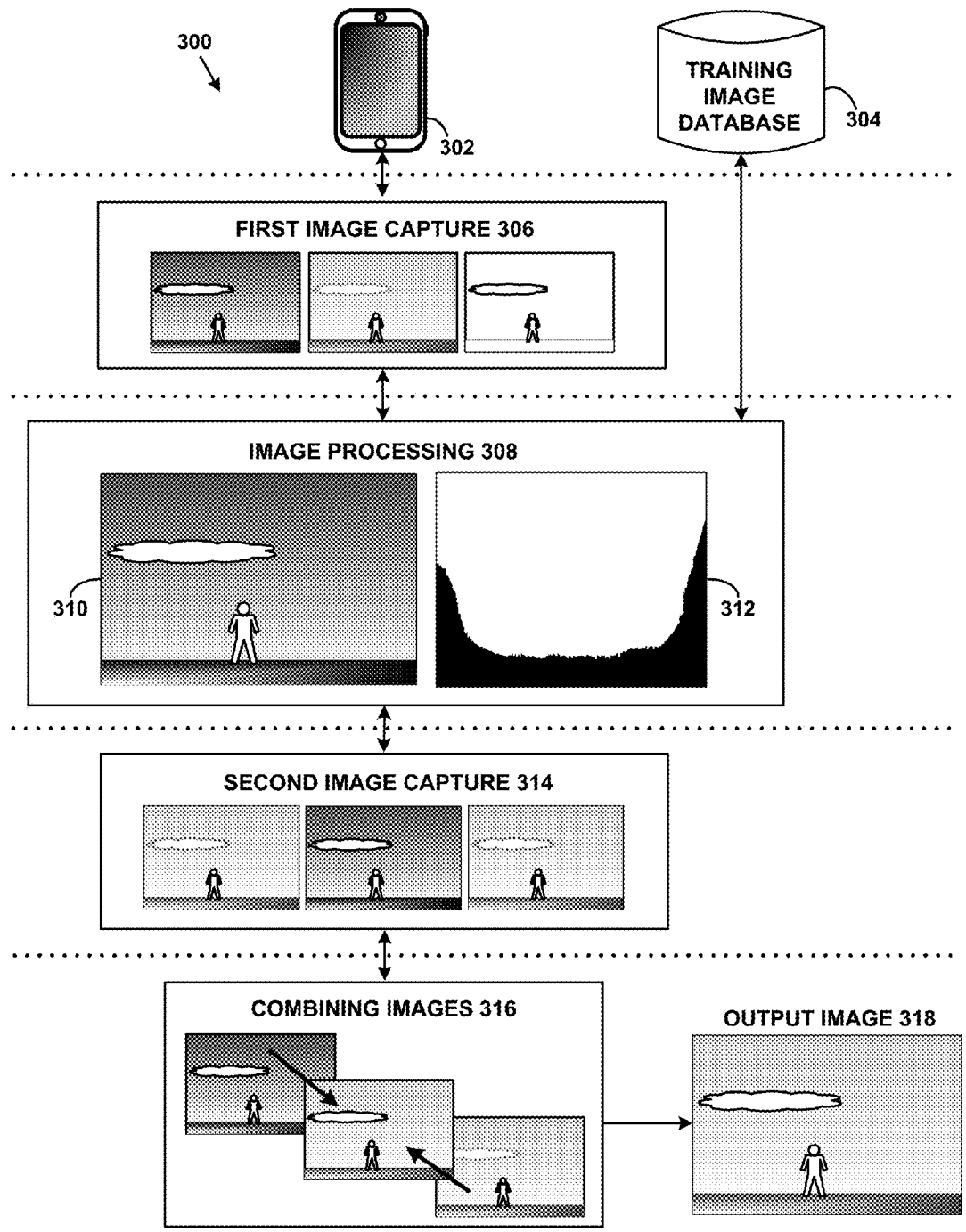
FIG. 3 depicts a flow chart, in accordance with an example embodiment.

FIG. 3 depicts a flow chart, in accordance with an example embodiment. At a high level, flow chart 300 represents an imaging pipeline for a digital camera device 302. For instance, flow chart 300 may represent a number of steps performed by digital camera device 302 to determine whether to use LDR or HDR image acquisition for a particular scene, determine one or more TETs with which to capture images of the scene, and whether and/or how to combine the captured images into an output image that is a reasonably satisfactory representation of the scene. In this way, digital camera device 302 can dynamically adapt to the lighting pattern of the scene, whether that pattern is dark, bright, or some combination of both. Digital camera device 302 may have the same or similar capabilities as digital camera device 100 in FIG. 1.

Flow chart 300 may represent a series of steps performed by digital camera device 302 when a shutter button is triggered. Alternatively or additionally, flow chart 300 may represent steps that are continuously performed when a viewfinder of digital camera device 302 is displaying a representation of a scene. Thus, in some embodiments, the features of flow chart 300 may be performed in a way that is not apparent to the user. For instance, the user may trigger the shutter once, with the intention of capturing a single image. However, digital camera device 302 may capture multiple images in each of first image capture 306 and second image capture 314, and provide an output image 318 that is a combination of one or more images captured during second image capture 314.

It should be noted that not all steps depicted in FIG. 3 need be performed by digital camera device 302. Some steps, such as image processing 308 and combining images 316, for example, could be performed by a different device. For instance, representations of one or more images captured during first image captures 306 and second image capture 314 could be transmitted from a capturing device to a remote computing device. The remote computing device could then perform image processing 308 and combining images 316, possibly transmitting some or all of the results thereof to the capturing device.

Additionally, training image database 304 may be included in digital camera device 302 or alternatively, training image database 304 may be part of a separate device or system that may be accessed by digital camera device 302. In some embodiments, training image database 304 may include representations of training images that can be used to help determine the structure of a payload burst used in second image capture 314.

In first image capture 306, a first group of images of a scene may be captured using a "metering burst sweep." In a metering burst sweep, each image in the group may be captured with a different TET. In some instances, the metering burst sweep may capture consecutive images across a range of TETs (e.g., 1-300 milliseconds, 0.1-500 milliseconds, or some other range). Using such ranges of TETs, the metering burst sweep may capture a series of images with TETs designed to cover this range according to a linear, logarithmic, and/or exponential distribution of TETs, among other possibilities.

As an example, FIG. 3 depicts first image capture 306 including three digital images of a scene, each captured with a different TET. The three images exhibit diverse levels of brightness due to the different TETs used to capture the images. In other examples, more or fewer images may be captured during first image capture 306. These captured images may provide parameters for digital camera device 302 to use when capturing subsequent images of the scene.

The metering burst sweep can be used to determine the characteristics of the scene so that a subsequent payload burst structure for second image capture 314 can be selected. Therefore, in step 308, the images captured at step 306 may be processed. Particularly, step 308 may include merging one or more of the images captured at step 306 in a combined image 310. Step 308 may also include forming a histogram 312 from the merged images, and then using the histogram, and possibly some or all of the information in training image data 304, to classify the scene (e.g., as an LDR scene or an HDR scene), determine the structure of the payload burst based on the classification of the scene, and determine the TETs to use when capturing images according to the payload burst. In some embodiments, the captured images, shown as a result of first image capture 306, may be downsampled prior to merging. Further, the histogram may be an LDR histogram, HDR histogram, a log HDR histogram, or some other form of histogram.

In step 314, the second group of images may be captured. The number of images captured and the arrangement of TETs used to capture these images may be referred to as a "payload burst." For example, in FIG. 3 second image capture 314 includes three images of a scene, each captured with a TET identified in step 308. It should be understood that the TETs identified in step 308 may be the same or different than the TETs used to capture images in step 306. Additionally, it is possible that all three images in second image capture 314 are captured with the same or similar TETs.

In step 316, images from the second group of images may be combined. Combining images may include aligning two or more of the images. In some instances, images may be aligned globally (i.e., aligning whole images as opposed to portions of images), locally (i.e., aligning portions of images perhaps at the pixel block and/or individual pixel level), or possibly both globally and locally. Further, combining two or more images may also include merging them to form an output image 318. This merging may be carried out in accordance with any image fusion technique now known or developed in the future.

Merging the images in the second group of images may result in output image 318 being sharper and/or better-exposed than any of the individual images in the second group. For instance, if some of the images in second image capture 314 are captured with the same or similar TETs, these images may be merged to reduce noise in one or more sections of the images. Alternatively or additionally, if the images in second image capture 314 are captured with two or more different TETs, at least some images with different exposure times may be merged according to HDR procedures. Regardless, the output image may be stored on a computer-readable medium and/or displayed on an output medium such as the multi-element display 106 of FIG. 1.

In some embodiments, the arrangements of various possible payload burst structures may be determined based on the TETs determined in step 308, as well as an understanding of combining images step 316. While numerous arrangements of payload burst structures may be possible, three examples are described herein.

TABLE 1

| Scene Type | Payload Burst Structure |
| --- | --- |
| LDR | T T T T |
| HDR | L S L L S L L S L L |
| HDR (with fallback) | L S L L S L L F F F |

Table 1 illustrates these examples. In the first example, the scene type is LDR. In this example, the payload burst structure includes four images captured sequentially, and may be referred to as an "LDR burst structure." Each "T" in the Payload Burst Structure column of Table 1 may represent a captured image. Each of these images may be captured using the same or a similar TET that was determined in step 308. In some embodiments, fewer or more images may be captured in an LDR payload burst. For example, as few as one, or as many as ten or more images may be included.

Regardless of the number of images captured, some of these images may be aligned and combined in step 316. For instance, if m images are captured in the payload burst, the sharpest one of these images may be selected as a "primary image," and the remaining m−1 images may be considered "secondary images." In some implementations, the sharpness of an image may be measured by the image's resolution and/or boundaries between zones of different tones and/or colors in the image. Alternatively or additionally, other sharpness measurements may be used.

Further, zero or more of the m−1 secondary images may then be aligned and merged with the sharpest image. For instance, alignment may be attempted between each of the secondary images and the sharpest image, respectively. If the alignment fails for parts of a respective secondary image, those parts may be discarded, and not combined with the primary image. In this way, the sharpest image may be de-noised with information from some or all of the secondary images.

In the second example, the scene type is HDR. In this example, the payload burst structure includes ten images captured according to a pattern of long and short TETs, and may be referred to as an "HDR burst structure." In the Payload Burst Structure column of Table 1, each "L" may represent an image captured with the long TET, each "S" may represent an image captured with the short TET. Thus, the pattern of "L S L L S L L S L L" may indicate that the first image of the payload burst is captured using the long TET, the second image is captured using the short TET, the third and fourth images are captured using the long TET, the fifth image is captured using the short TET, the sixth and seventh images are captured using the long TET, the eighth image is captured using the short TET, the ninth image is captured using the long TET, and the tenth image is captured using the long TET.

The long and short TETs may be determined based on the results of image processing 308. Thus, the long and short TETs may be selected so that the resulting images captured with these TETs can be combined using HDR procedures. The long TET may be used to capture the details in dark sections of the scene, while the short TET may be used to capture the details in bright sections of the scene.

Examples of short TET values may include TETs of 1 millisecond, 2 milliseconds, and/or 8 milliseconds, while examples of long TET values may include TETs of 20 milliseconds, 40 milliseconds, and/or 80 milliseconds. However, short and long TETs may take on different values.

Despite the payload burst in the second example having a particular structure in Table 1, other structures may be used. For example, payload burst structures of "L S L S L S L S L S" or "L L S L L S L L S L" could potentially provide suitable patterns of long and short TETs. Further, some payload burst structures may include fallback TETs (denoted by an "F"). Thus, additional example payload bursts may include "S F L L L S F L L L" or "S F L S F L S F L L" structures.

In some embodiments, a payload burst structure may include more or fewer than ten images. Generally speaking, the determining the length of the payload burst structure involves a tradeoff. On one hand, a long payload burst (i.e., a payload burst with a large number of image captures) is desirable because the likelihood of one or more of the captured image being well-exposed and sharp is increased. On the other hand, if the payload burst is too long, the likelihood of ghosting (double images or slightly offset, faded copies of an image) due to movement in the scene is also increased. Additionally, darker scenes may benefit from images captured using a longer TET, so that more light can reach the recording surface. Therefore, the payload burst structure may be based, possibly in part, on these considerations.

In the third example, the scene type is also HDR. However, in this example, the associated payload burst structure (which also may be referred to as an HDR burst structure) includes seven images captured according to a pattern of long and short TETs, followed by three fallback TETs. Each "F" may represent an image captured with the fallback TET, and the fallback TET may take on a value different from both the long and short TETs.

Regardless of the type of payload burst structure, the images of an HDR scene may be aligned and combined. Images captured using the short TET may be referred to as "short images" for convenience, and images captured with the long TET may be referred to as "long images" for convenience.

In some embodiments, the sharpest short image may be selected, from the short images, as the primary short image. Zero or more of the remaining secondary short images may then be aligned and merged with the primary short image. For instance, alignment may be attempted between each of the secondary short images and the primary short image, respectively. If the alignment fails for parts of the respective secondary short image, those parts may be discarded, and not combined with the primary short image. In this way, the sharpest short image may be de-noised with information from some of the secondary short images.

The same or a similar process may be undertaken for the long images. For example, the sharpest long image may be selected, from the long images, as the primary long image. Zero or more of the remaining secondary long images may then be aligned and merged with the primary long image. Alignment may be attempted between each of the secondary long images and the primary long image, respectively. If the alignment fails for parts of the respective secondary long image, those parts may be discarded, and not combined with the primary long image.

The resulting combined short image (e.g., the sharpest short image possibly de-noised by information from zero or more secondary short images) and the resulting combined long image (e.g., the sharpest long image possibly de-noised by information from zero or more secondary long images) may then be aligned. If the alignment succeeds, these two images (e.g., both LDR images) may be combined according to HDR procedures. For instance, they may be combined into an HDR image, and the HDR image may then be locally tonemapped so that its brightness falls within a range commensurate with the display abilities of convention video output devices (e.g., pixel values between 0 and 255, inclusive). The resulting locally tonemapped HDR image may be designated as output image 318. In some embodiments, if the signal-to-noise ratio of part or all of output image 318 is still lower than a threshold value, a de-noising procedure may be applied to further reduce noise. Additionally, output image 318 may also be sharpened, possibly after applying the de-noising procedure. In general, various types of HDR fusion algorithms, such as Exposure Fusion or Local Laplacian Filters, may be used to merge short and long images. If fallback TETs are used in the payload burst structure, these HDR fusion algorithms may be applied to one or more fallback images as well.

If the alignment fails between the combined short image and the combined long image, then the HDR processing fails. However, if fallback images were captured, one or more of the fallback images may be used to form output image 318. For instance, the sharpest fallback image may be selected. Zero or more of the remaining secondary fallback images may be aligned and combined with the sharpest fallback image carried out in a similar fashion as the processes described above for the short and long images. For payload burst structures without fallback images in which alignment fails, the combined long or short image may be used to form output image 318.

Generally speaking, image alignment may involve computational methods for arranging two or more images over one another so that they "match." Once the images are aligned, various functions can be performed, such as image enhancement (e.g., noise reduction), image stabilization (e.g., to compensate for the shaking of a video camera), pattern matching (e.g., identification of common elements in two or more images), and object recognition (e.g., finding a specific object in two or more images), as well as other functions.

Given the various uses of image alignment, it is advantageous to be able to perform image alignment in an efficient and robust fashion. In practice, a global alignment (i.e., translating the whole image by a number of pixels on the x-axis and by a potentially different number of pixels on the y-axis) may be performed. Alternatively, instead of or in addition to aligning the whole image according to these x and y offsets, it may be advantageous to break the image into a number of smaller tiles, where each tile is an m×n pixel block, and align these tiles separately according to respective individual offsets. The size of each tile may be as small as a 1×1 pixel block (i.e., one pixel). The result the alignment might include some tiles being offset differently than others.

Numerous image alignment techniques may be used with the embodiments herein. For instance, one possible option is to use optical flow, which performs both global (e.g., image level) alignment and local (e.g., the level and/or pixel level) alignment. Other techniques include using affine transforms or homography for global alignment, followed by any type of local alignment. An affine transform may result in one of the images being shifted, scaled, and rotated as it is aligned to the other image. A homography transform may result in one of the images being shifted, scaled, rotated, and warped as it is aligned to the other image. The local alignment may involve using row and/or column sums, Fourier transforms, brute force, or other techniques to refine the global alignment.

Figure 4:
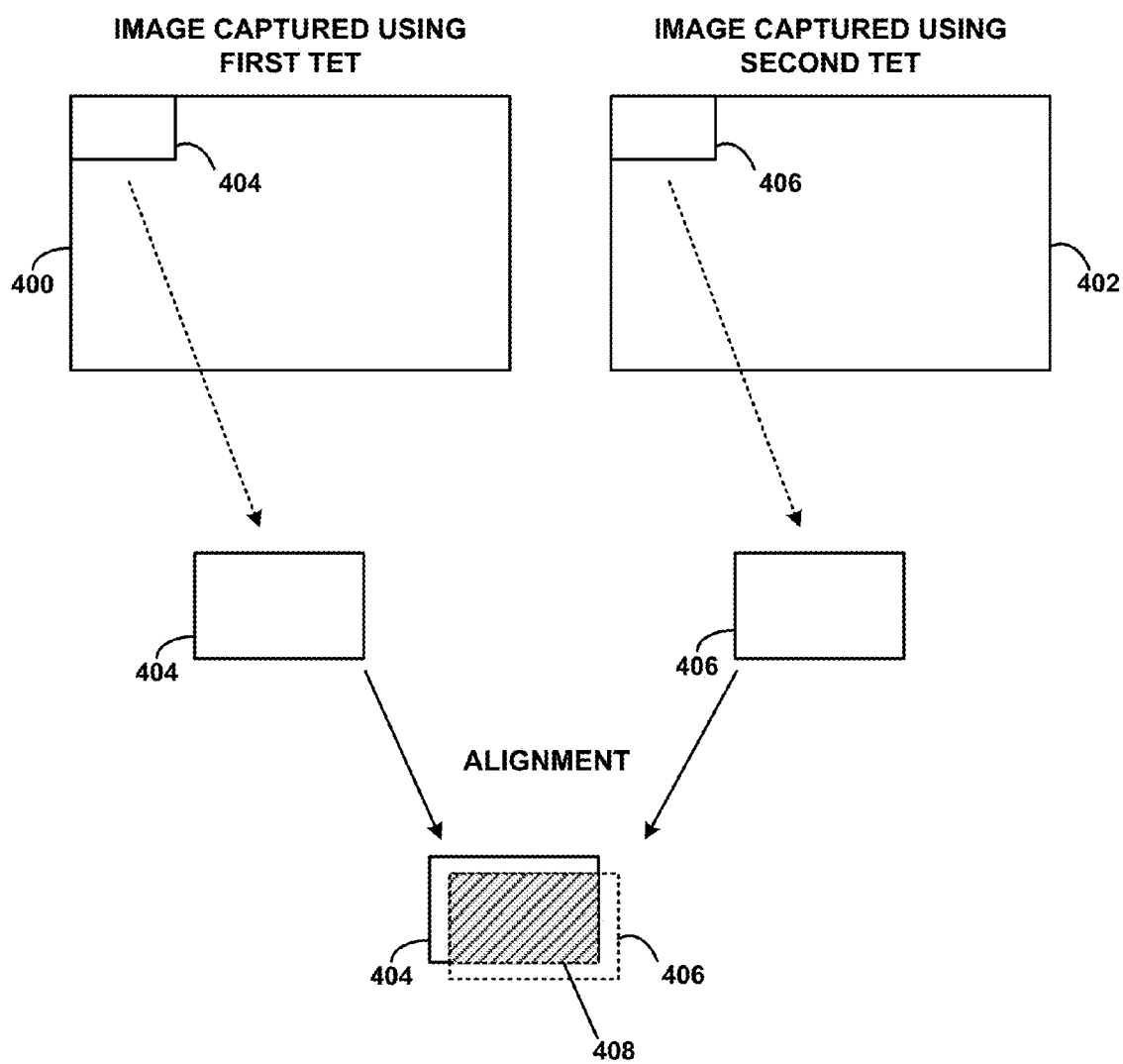
FIG. 4 depicts image alignment, in accordance with an example embodiment.

FIG. 4 depicts an example alignment of a short TET image 400 ("short image 400") and a long TET image 402 ("long image 402"). Short image 400 may be a combined short image, and/or long image 402 may be a combined long image. Short image 400 and long image 402 may have been captured, perhaps during second image capture 314, as part of a payload burst of images of a scene. Alternatively, the example alignment depicted in FIG. 4 may be between two or more images captured with a similar or identical TET. For instance, all images may have been captured using a short TET, a long TET, or some other TET.

Optionally, short image 400 and long image 402 may be divided into m×n pixel tiles, and associated pairs of tiles may be aligned with one another. For instance, tile 404 from the upper left hand corner of short image 400 and tile 406 from the upper left hand corner of long image 402 may be selected for alignment with one another. As shown in FIG. 4, either tile 404 or tile 406 may be shifted vertically or horizontally during the alignment process. This shifting may occur due to movement in the scene or movement of the camera device between when short image 400 and long image 402 are captured. Nonetheless, the resulting overlap area 408 between short image 400 and long image 402 may encompass only subsets of each image. The illustrated procedure of aligning individual tiles may be repeated for all pairs of tiles in short image 400 and long image 402.

Alternatively, overlap area 408 may encompass more than just a tile of short image 400 or long image 402. For instance, tile 404 may be selected from short image 400. Then, tile 404 may be "slid" around and/or placed in a series of locations in long image 402 until a sufficient match between the contents of tile 404 and a corresponding region of long image 402 is found. Then, a pixel by pixel pairwise alignment of tile 404 with this region may be performed.

As part of the alignment process, various checks may be performed to determine the accuracy of the alignment. If these checks indicate that the alignment is reasonably accurate (e.g., one or more values that measure alignment error are within pre-determined tolerances), then the images may be merged according to the alignments of each pair of tiles. As noted above, the merging process may use various types of HDR fusion algorithms, such as Exposure Fusion and/or Local Laplacian Filters.

Once aligned, one of the images may be enhanced by merging it with portions of some of the other images. The resulting output image may provide a sharper, lower-noise, and/or better-exposed version of the scene than any of the individual images.

As an example, a camera device may capture several images of a scene. One of these images, usually the sharpest, may be chosen as a base image. However, sections of the base image may be blurry, noisy, too dark, or too light. Thus, it may be beneficial to select at least some portions of the other images of the scene to use to enhance corresponding portions of the base image. For instance, if a section of the base image suffers from noise that obscures details of the scene, a corresponding section from an alternate image that has preserved these details may be combined with or replace the section of the base image. The resultant output image may be a better representation of the scene than either the base image or the alternate image.

In some cases, and as noted above, the base image and the alternate image may have been captured using different TETs. For example, the base image may have been captured using a long TET and the alternate image may have been captured using a short TET. Thus, parts of the base image may be over-exposed, but corresponding parts of the alternate image may be properly exposed. Conversely, parts of the alternate image may be under-exposed, while corresponding parts of the base image may be properly exposed. In some embodiments, the base image may have been captured using a short TET and the alternate image may have been captured using a long TET. Further, in some cases, the base and alternate images may be the result of respective merges of several images captured with the same respective TETs.

The techniques described below do not require the base and alternate images to have been captured with different TETs. Thus, the base and alternate images may have been captured with the same TET.

To enhance the base image with details present in the alternate image, each pixel in an output image may be selected from either the base image or the alternate image. The decision of whether to use a pixel from the base image or the alternate image may be made in various ways. For instance, if each color channel (e.g., R, G, and B, or Y, U, and V) of the base image pixel takes on a value below 255, the base image pixel might be selected. Otherwise, the alternate image pixel might be selected.

To represent whether a particular pixel in the output image is to be taken from the base image or the alternate image, a blend map may be constructed. Suppose that tile X from the base image and tile Y from the alternate image are being considered, and that tile Z is the corresponding tile of the output image. Tiles X and Y may have been aligned with one another.

As noted above, each of these tiles may be an m×n pixel block. Thus, the blend map may be an m×n binary array. Each location in the blend map may either be a 0, indicating that the pixel from the base image is to be taken, or a 1, indicating that the pixel from the alternate image is to be taken. In some embodiments, locations in the blend map may take on non-binary values.

More formally, for tiles X, Y, and Z, and a blend map B:

$Z(i,j)=X(i,j)$, if $B(i,j)=0$ $Z(i,j)=Y(i,j)$, if $B(i,j)=1$

The above equations may assume that the brightnesses of tiles X and Y have been scaled to match one another. For example, if tile X was captured using a TET of 2, tile Y was captured using a TET of 7, and both have values limited to 0 through 255, inclusive, then a digital gain of 3.5× may be applied to the brightness values of pixels in tile X before doing operations to construct tile Z. As a result, tile Z would then have a "virtual TET" of 7.

In some embodiments, before constructing tile Z of the output image, the blend map may be modified. For instance, perhaps after scaling the brightness of one or both tiles so that they match, the pixel values for corresponding pixels in the base image and the alternate image may disagree beyond a threshold (e.g., the absolute difference of these values may exceed the threshold). If this is the case, these pixels may be considered to conflict with one another, and it may not be clear which of the pixels should be selected for the output image.

In one example, suppose that the base image and the alternate image were captured using the same TET. Then, assuming the alignment of tiles X and Y succeeds, $X(i,j)$ and $Y(i,j)$ should have about the same value, or have no more than a threshold difference. Alternatively, if the base image was captured with a TET of x and the alternate image was captured with a TET of y, then $X(i,j)$ should be about $Y(i,j)(x/y)$ within some tolerance.

In some situations, reverse tonemapping may be applied to $X(i,j)$ and $Y(i,j)$ before these values are compared. Tonemapping is a set of procedures that include mapping pixel values according to a pre-determined function. Thus, for instance, some image capture devices map pixel values from a linear space (wherein an increase or decrease of k units in pixel value represents a proportional increase or decrease in brightness) to a non-linear space. Tonemapping may be automatically performed for artistic purposes, such as brightening mid-range pixel values. Tonemapping also allows an image to be displayed properly on most displays, which may have nonlinear response functions.

Regardless, in order to reverse tonemap the selected pixels back to linear space, the inverse of the tonemapping function may be applied to respective pixel values. As an example for images captured with different TETs, $Y(i,j)$ may be first reverse tonemapped from an LDR value to a linear value, and then multiplied by x/y. The resulting product may then be tonemapped back to an LDR value before being compared to the other pixel value. This process helps maintain the linearity of the multiplicative relationship between the two pixel values. In some cases, a high-pass and/or a low-pass filter may be applied to the resulting product prior to, or after, tonemapping it to the LDR value.

There may be other ways to determine when corresponding pixels from the base image and the alternative image conflict with one another. In the examples below it is assumed, without loss of generality, that the base image was captured using a longer TET than the alternate image.

Regardless of the TETs used, these conflicts for a given pair of tiles may be represented by an m×n binary array called a conflict map. Each location in the conflict map, $C(i,j)$, may be 0 if the corresponding pixels in tile X and Y do not conflict, or, the location may be 1 if the corresponding pixels do conflict. In some embodiments, locations in the conflict map may take on non-binary values.

Figure 5A:
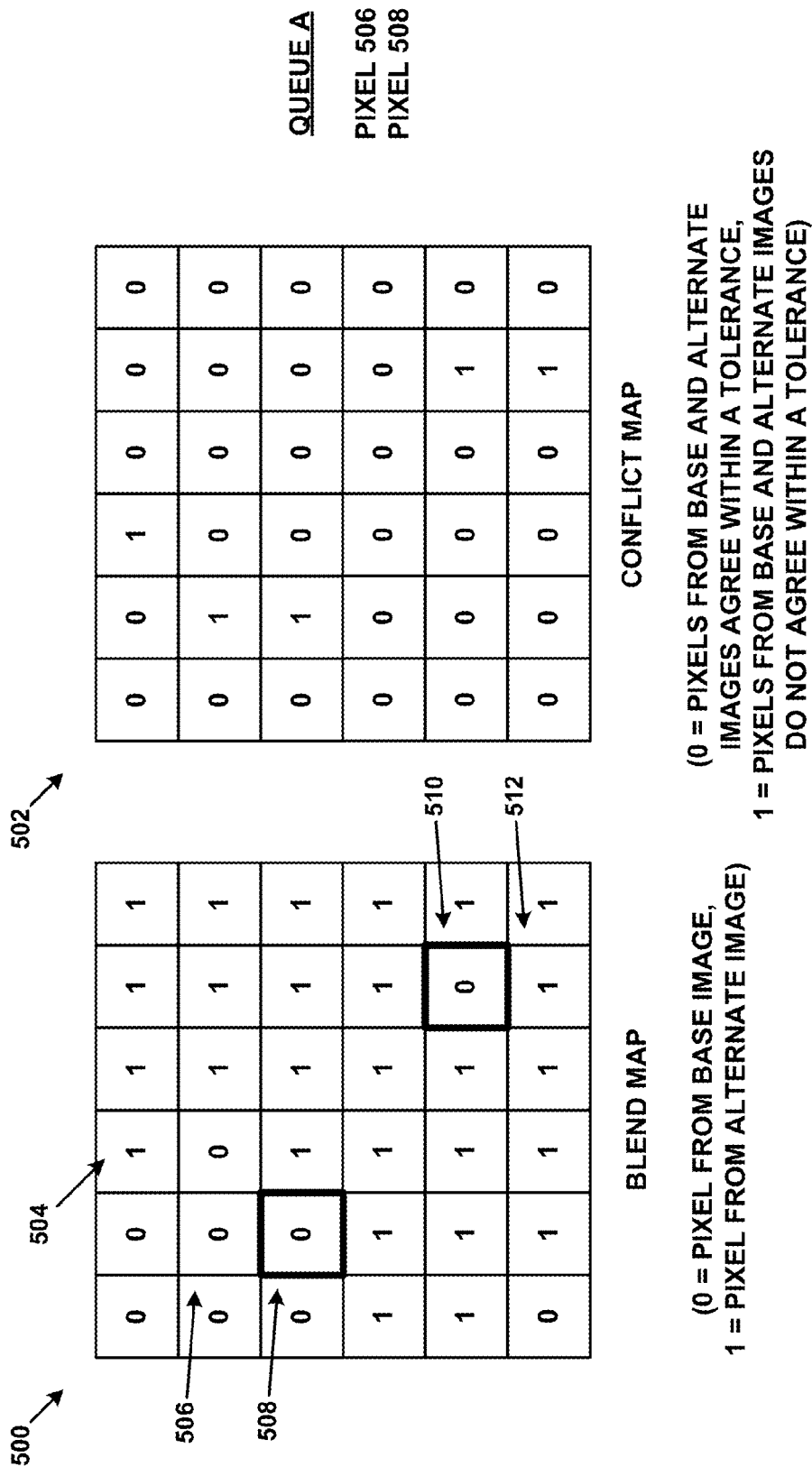
FIG. 5A depicts content and processing of a blend map and a conflict map, in accordance with an example embodiment.

An example of a 6×6 blend map 500 and a corresponding 6×6 conflict map 502 are shown in FIG. 5A. Conflict map 502 indicates that five pairs of pixels in tile X and tile Y are in conflict. The pixel locations of the pixels in conflict are identified on blend map 500 as pixel locations 504, 506, 508, 510, and 512.

In some embodiments, prior to the modifications described below, a two-dimensional median filter may be applied to the blend map. Alternatively, a two-dimensional min filter followed by a two-dimensional max filter (or vice versa) may be applied to the blend map. This filtering may serve to reduce impulse noise (small holes or islands of pixels which exhibit one or more significantly different color channel values than neighboring pixels) in the image, while maintaining edges.

For pixels for which there is a conflict, in some cases it may be beneficial to modify the blend map. For example, conflicts are usually not problematic when they occur deep in an area where the blend map indicates that all pixels should come from either one image or the other. However, conflicts located along a 0/1 edge (the blend zone) in the blend map are more likely to be noticeable and unappealing in the output image (e.g., they appear as "ghosting"). Therefore, when there is a conflict in the blend zone, the corresponding blend map values may be modified.

Since it is assumed that the base image was captured using a longer TET than the alternate image, it is generally safer to set blend map values with conflicts to 1 rather than 0. This is because the pixel captured using the longer TET is more likely to be clipped at 255, resulting in a loss of information at that pixel, whereas the pixel captured using the shorter TET is less likely to be clipped.

In some embodiments, the following procedure may be followed. All pixel locations are identified for which $C(i,j)=1$, $B(i,j)=0$, and at least one adjacent neighboring pixel location the blend map is 1. For the latter determination, 4 adjacent neighboring pixel locations (up, down, left, and right) may be considered. In other embodiments a different number of adjacent neighboring pixel locations and/or different neighboring pixel locations may be considered. Nonetheless, this process identifies pixel locations that are on a 0/1 edge (i.e., in the blend zone) and in conflict. Pixels identified are placed in a queue described below as queue A. In FIG. 5A, pixel locations 508 and 510 would be identified by this procedure.

Then, the blend zone may be grown in one or more growth passes. In each growth pass, two iterations over queue A may be performed. In iteration 1, the blend map values of each pixel location in queue A are set to 1. The result of this first iteration is shown in FIG. 5B.

Figure 5B:
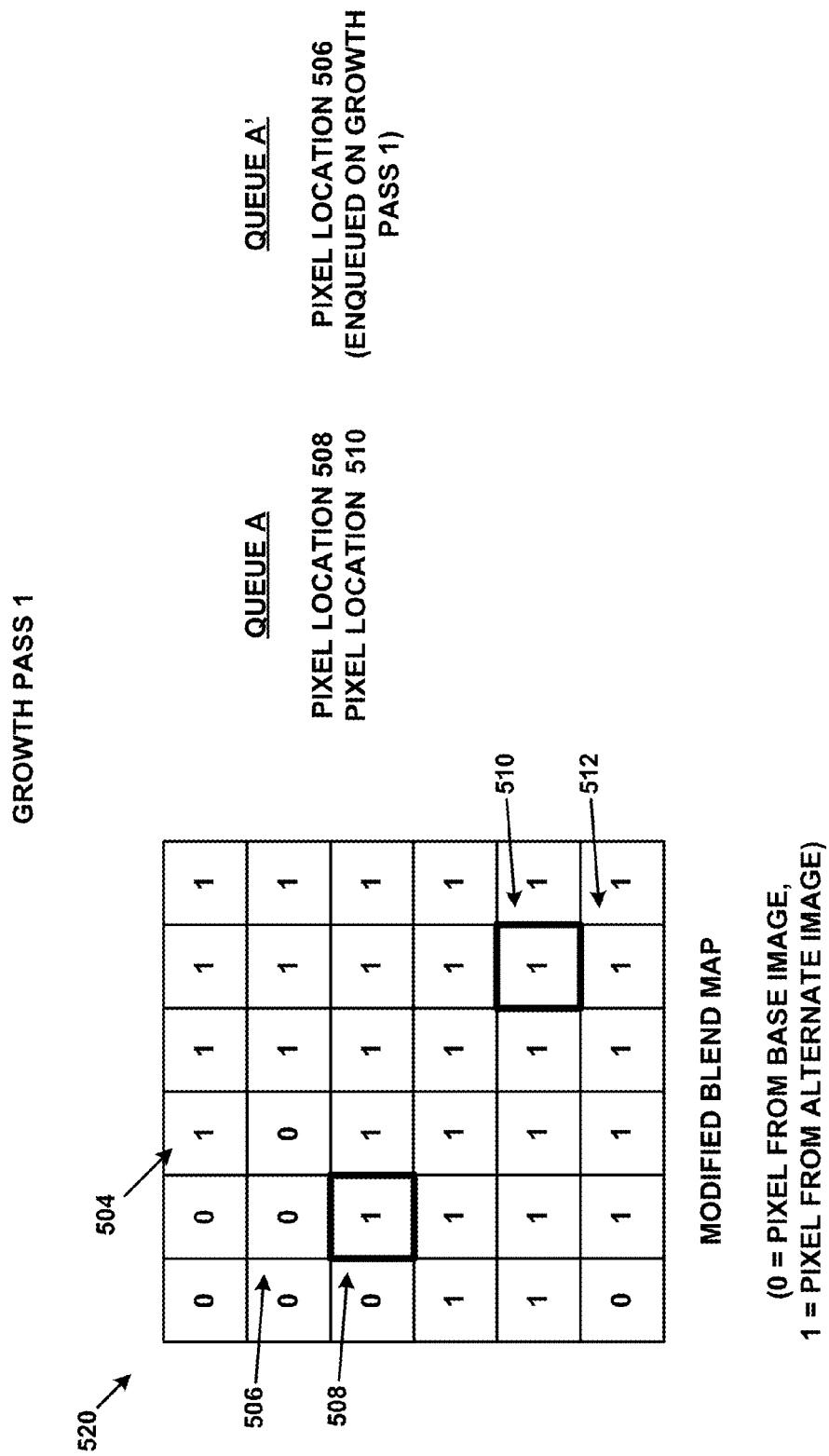
FIG. 5B depicts content and processing of a blend map, in accordance with an example embodiment.

Particularly, FIG. 5B shows that the blend map values at pixel locations 508 and 510 have been set to 1 in modified blend map 520. Then, in iteration 2 of growth pass 1, the neighbors of each pixel location that was modified in iteration 1 are checked. These neighbors may be the 4 adjacent neighbor locations (up, down, left, and right), or a different number of adjacent neighbor locations and/or different locations of adjacent neighbors may be considered. Nonetheless, it is determined whether each neighbor pixel location (i,j) meets the following condition: $C(i,j)=1$, $B(i,j)=0$, and the neighbor pixel location has not been enqueued on a second queue, queue A', on this growth pass. If all of these conditions are met, the neighbor pixel location is added to queue A'. In modified blend map 520, the only pixel location that meets all of these conditions is pixel location 506.

At this point, the content of queue A is replaced by the content of queue A', and queue A' is cleared. Then, iteration 1 of growth pass 1 ends.

Growth pass 2, and any further growth passes, repeats the procedure described above for growth pass 1. The growth passes end when either of two possible termination conditions occur. The first termination condition is that queue A is empty. This indicates that alignment of the pixels was successful and that merging of the pixels may be carried out according to the blend map. The second condition is that a total number or percent of pixels that were set to 1 during the growth passes exceed a threshold value (e.g., 2% of all pixels in the tile, 5% of all pixels in the image, etc.). This indicates that the alignment of the images and/or tiles has failed, and that tile Y should not be merged with tile X.

Figure 5C:
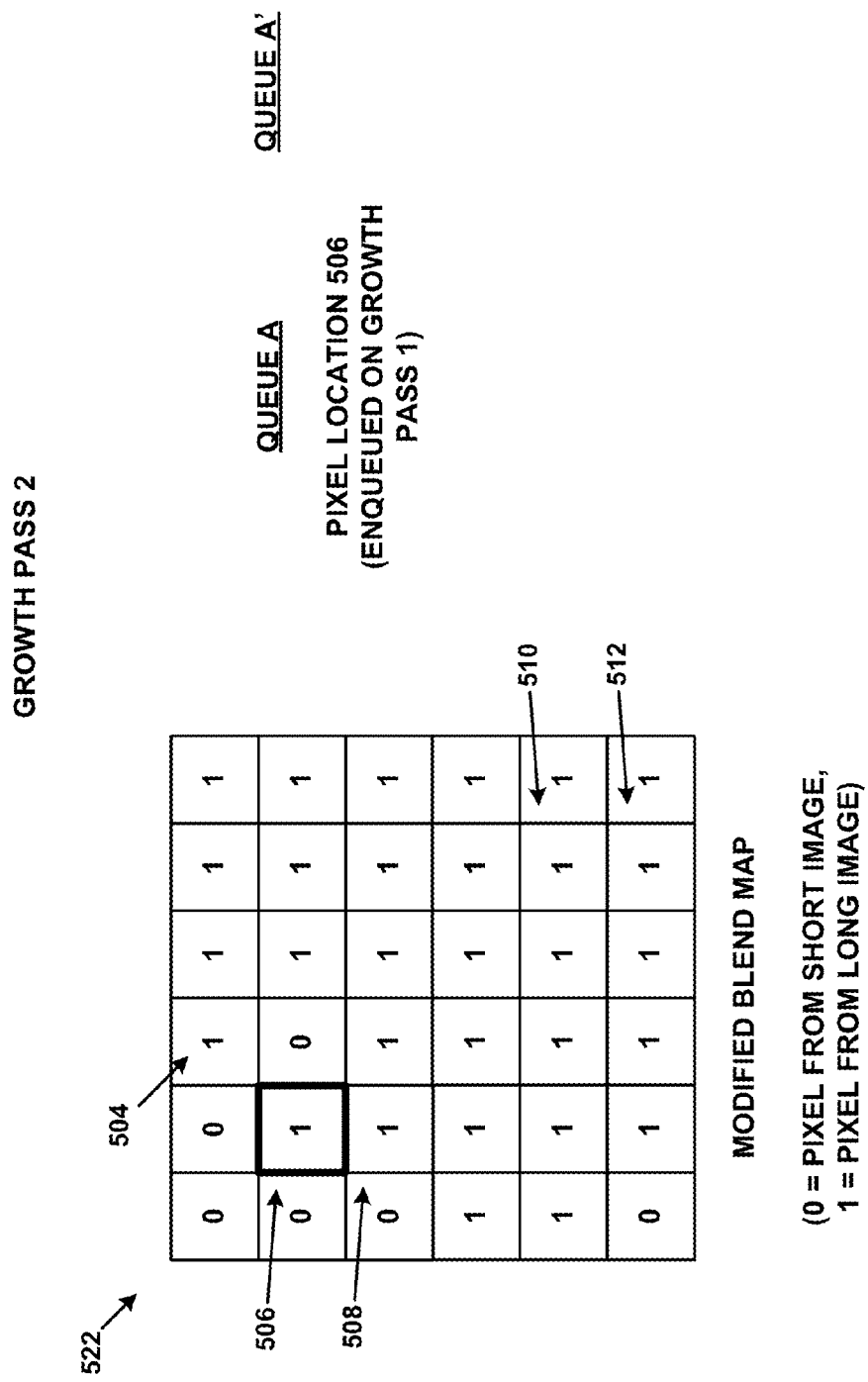
FIG. 5C also depicts content and processing of a blend map, in accordance with an example embodiment.

Thus, in iteration 1 of growth pass 2, pixel location 506 is set to 1. The modified blend map is shown in FIG. 5C. Since no neighboring pixels locations meet the criteria for being added to queue A', queue A' remains empty, and queue A is emptied at the end of growth pass 2. Therefore, the growth passes end after growth pass 2, because one of the termination conditions (queue A being empty) has been met.

Once the growth passes terminate, some additional modifications may be made to the blend map. For instance, a max filter may be applied to the blend map. The radius used by the max filter may depend on the size of the image. For instance, for a 5 megapixel image, a radius of 4 pixels may be used.

Additionally, the blend map may be modified to take on 8-bit values. Thus, a 0 in the binary blend map becomes a 0 in the 8-bit blend map, and a 1 in the binary blend map becomes a 255 in the 8-bit blend map. The 8-bit blend map may be blurred using a similar radius as was used by the max filter.

The blend map may be used to merge the base image and the alternate image into a single, linear, 16-bit image. One, the other, or both of the base and alternate images may have been scaled to the same virtual exposure before merging. A number of synthetic exposures, n, may be derived from the 16-bit image. The value of n may be, for instance, between 2 and 5, inclusive. These synthetic exposures may be merged using an HDR local tonemapping algorithm (such as Exposure Fusion, or Local Laplacian Filters) into a single, 8-bit, locally-tonemapped image. Alternatively, the step of forming the 16-bit image may be skipped, and an HDR local tonemapping algorithm may be used to merge the base image and the alternate image directly.

Figure 6:
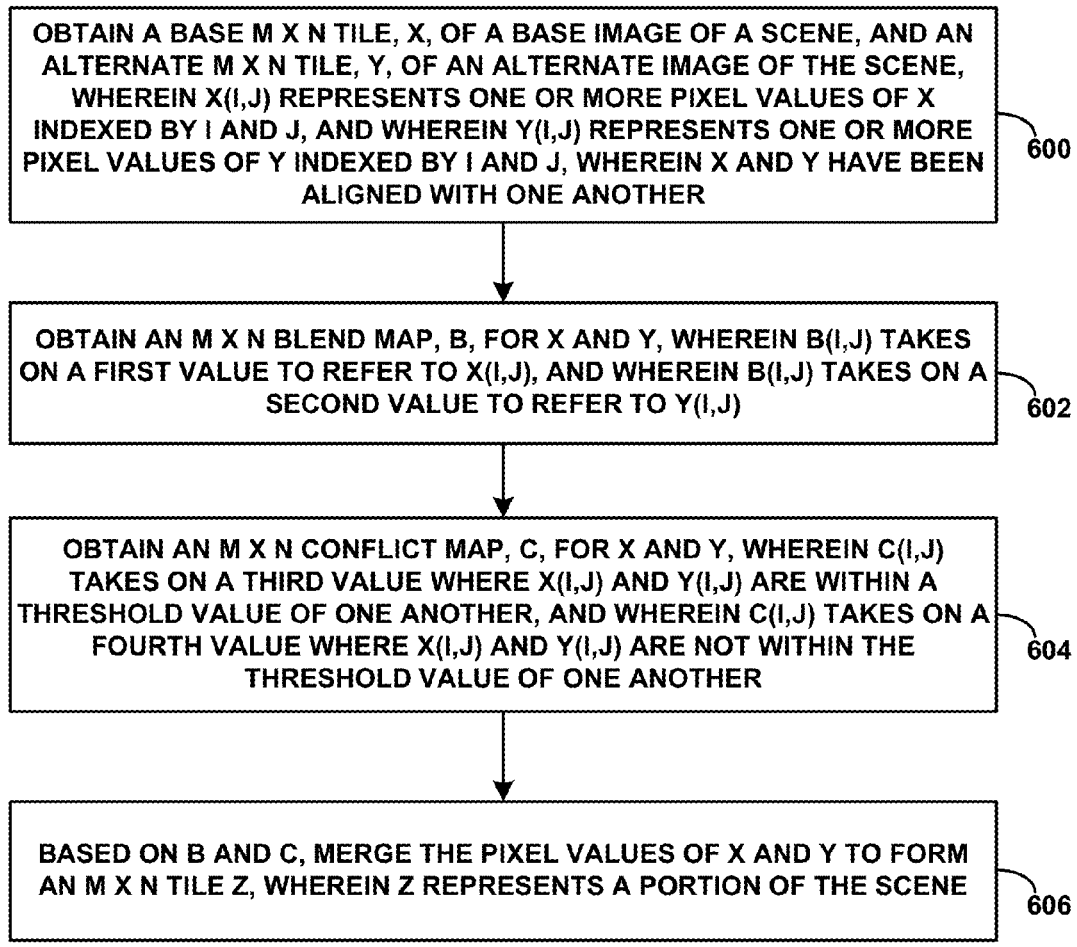
FIG. 6 is a flow chart, in accordance with an example embodiment.

FIG. 6 depicts a flow chart, in accordance with an example embodiment. At step 600, a base m×n tile, X, of a base image of a scene, and an alternate m×n tile, Y, of an alternate image of the scene may be obtained. Tile X may represent a portion of the base image, and tile Y may represent a portion of the alternate image. $X(i,j)$ may represent one or more pixel values of X indexed by i and j, and $Y(i,j)$ may represent one or more pixel values of Y indexed by i and j. X and Y may have been aligned with one another. The base image may have been captured with a longer TET than the alternate image.

At step 602, an m×n blend map, B, for X and Y may be obtained. $B(i,j)$ may take on a first value to refer to $X(i,j)$, or a second value to refer to $Y(i,j)$. In some embodiments, B may be an m×n binary blend map, where the first value is 0 and the second value is 1. Obtaining B may involve, for $0 \le i \le m$ and $0 \le j \le n$, setting $B(i,j)$ to the first value where the one or more pixel values of $X(i,j)$ are less than a blend map threshold value, or setting $B(i,j)$ to the second value where the one or more pixel values of $X(i,j)$ are greater than or equal to the blend map threshold value. The blend map threshold value may be, for instance, 255.

At step 604, an m×n conflict map, C, for X and Y may be obtained. $C(i,j)$ may take on a third value where $X(i,j)$ and $Y(i,j)$ are within a threshold value of one another, or a fourth value where $X(i,j)$ and $Y(i,j)$ are not within the threshold value of one another. In some embodiments, C may be an m×n binary conflict map, where the third value is 0 and the fourth value is 1. Obtaining C may involve, for $0 \le i \le m$ and $0 \le j \le n$, setting $C(i,j)$ to the third value where $X(i,j)$ and $Y(i,j)$ are within the threshold value of one another, or setting $C(i,j)$ to the fourth value where $X(i,j)$ and $Y(i,j)$ are not within the threshold value of one another. In some cases, $X(i,j)$ and $Y(i,j)$ being within the threshold value of one another may indicate that the difference between $X(i,j)$ and $Y(i,j)$ is less than the threshold value.

Alternatively or additionally, the base image may have been captured with a TET of x and the alternate image captured with a TET of y, where $C(i,j)$ is the third value when $X(i,j)$ and $Y(i,j)(x/y)$ are within the threshold value of one another, and where $C(i,j)$ is the fourth value when $X(i,j)$ and $Y(i,j)(x/y)$ are not within the threshold value of one another. Additionally, reverse tonemapping may be applied to at least one of $X(i,j)$ and $Y(i,j)$ prior to making the comparison between $X(i,j)$ and $Y(i,j)(x/y)$.

At step 606, based on B and C, the pixel values of X and Y may be merged to form an m×n tile Z that represents a portion of the scene. Merging the pixel values of X and Y to form Z may involve setting $B(i,j)$ to the second value where $B(i,j)$ is the first value, $C(i,j)$ is the fourth value, and at least one adjacent neighbor to $B(i,j)$ in B is the second value, setting $Z(i,j)$ to $X(i,j)$ where $B(i,j)$ is the first value, and setting $Z(i,j)$ to $Y(i,j)$ where $B(i,j)$ is the second value.

In some embodiments, blend map adjustments may propagate between tiles. Thus, even if alignment occurs on a per-tile basis, merging may occur across multiple tiles or on the whole image at once. For instance, the m×n tiles X and Y may be considered to be the size of the entire image.

Alternatively or additionally, merging the pixel values of X and Y to form Z may involve determining an m×n blend map, B', where $B'(i,j)$ is set to a fifth value where $B(i,j)$ is the first value, and wherein $B'(i,j)$ is set to a sixth value where $B(i,j)$ is the second value, based on B', merging X and Y into a high dynamic range image, creating a plurality of synthetic exposures of B', where at least two of the synthetic exposures are associated with different TETs, and forming Z based on the plurality of synthetic exposures of B'. As a result, Z may be a low dynamic range image. In some embodiments, the fifth value may be 0 and the sixth value may be 255.

The steps depicted in FIG. 6 may be carried out by a camera device, such as digital camera device 100, a computing device, such as computing device 200, and/or by two or more distinct devices. Further, the flow chart depicted in FIG. 6 may be modified according to the variations disclosed in this specification and/or the accompanying drawings.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   capturing, by an image sensor, a base digital image of a scene and an alternate digital image of the scene, wherein the base digital image of the scene includes a base m×n tile, X, wherein the alternate digital image of the scene includes an alternate m×n tile, Y, wherein $X(i,j)$ represents one or more pixel values of X indexed by i and j, and wherein $Y(i,j)$ represents one or more pixel values of Y indexed by i and j;
   aligning, by a computing device, X and Y with one another;
   obtaining, by the computing device, an m×n blend map, B, for X and Y, wherein $B(i,j)$ takes on a first value to refer to $X(i,j)$, and wherein $B(i,j)$ takes on a second value to refer to $Y(i,j)$;
   obtaining, by the computing device, an m×n conflict map, C, for X and Y, wherein $C(i,j)$ takes on a third value where $X(i,j)$ and $Y(i,j)$ are within a threshold value of one another, and wherein $C(i,j)$ takes on a fourth value where $X(i,j)$ and $Y(i,j)$ are not within the threshold value of one another; and
   based on B and C, merging, by the computing device, the pixel values of X and Y to form an output m×n tile Z, wherein Z represents a portion of the scene.

2. The method of claim 1, wherein B is an m×n binary blend map, wherein the first value is 0, and wherein the second value is 1.

3. The method of claim 1, wherein C is an m×n binary conflict map, wherein the third value is 0, and wherein the fourth value is 1.

4. The method of claim 1, wherein obtaining B comprises: for $0 \le i \le m$ and $0 \le j \le n$, setting $B(i,j)$ to the first value where the one or more pixel values of $X(i,j)$ are less than a blend map threshold value, and setting $B(i,j)$ to the second value where the one or more pixel values of $X(i,j)$ are greater than or equal to the blend map threshold value.

5. The method of claim 4, wherein the blend map threshold value is 255.

6. The method of claim 1, wherein obtaining C comprises: for $0 \le i \le m$ and $0 \le j \le n$, setting $C(i,j)$ to the third value where $X(i,j)$ and $Y(i,j)$ are within the threshold value of one another, and setting $C(i,j)$ to the fourth value where $X(i,j)$ and $Y(i,j)$ are not within the threshold value of one another.

7. The method of claim 6, wherein $X(i,j)$ and $Y(i,j)$ being within the threshold value of one another comprises the difference between $X(i,j)$ and $Y(i,j)$ being less than the threshold value.

8. The method of claim 1, wherein merging the pixel values of X and Y to form Z comprises:
   setting $B(i,j)$ to the second value where $B(i,j)$ is the first value, $C(i,j)$ is the fourth value, and at least one adjacent neighbor to $B(i,j)$ in B is the second value;

setting Z(i,j) to X(i,j) where B(i,j) is the first value; and
setting Z(i,j) to Y(i,j) where B(i,j) is the second value.

9. The method of claim 1, wherein merging the pixel values of X and Y to form Z comprises:
  determining an m×n blend map, B', wherein B'(i,j) is set to a fifth value where B(i,j) is the first value, and wherein B'(i,j) is set to a sixth value where B(i,j) is the second value;
  based on B', merging X and Y into a high dynamic range image;
  creating a plurality of synthetic exposures of B', wherein at least two of the synthetic exposures are associated with different total exposure times (TETs); and
  forming Z based on the plurality of synthetic exposures of B', wherein Z is a low dynamic range image.

10. The method of claim 9, wherein the fifth value is 0 and the sixth value is 255.

11. The method of claim 1, wherein the base digital image was captured with a longer total exposure time (TET) than the alternate digital image.

12. The method of claim 11, wherein the base digital image was captured with a TET of x and the alternate digital image was captured with a TET of y, wherein C(i,j) is the third value where X(i,j) and Y(i,j)(x/y) are within the threshold value of one another, and wherein C(i,j) is the fourth value where X(i,j) and Y(i,j)(x/y) are not within the threshold value of one another.

13. An article of manufacture including a non-transitory computer-readable medium, having stored thereon program instructions that, upon execution by a computing device, cause the computing device to perform operations comprising:
  obtaining a base m×n tile, X, of a base image of a scene, and an alternate m×n tile, Y, of an alternate image of the scene, wherein X(i,j) represents one or more pixel values of X indexed by i and j, and wherein Y(i,j) represents one or more pixel values of Y indexed by i and j, wherein X and Y have been aligned with one another;
  obtaining an m×n blend map, B, for X and Y, wherein B(i,j) takes on a first value to refer to X(i,j), and wherein B(i,j) takes on a second value to refer to Y(i,j);
  obtaining an m×n conflict map, C, for X and Y, wherein C(i,j) takes on a third value where X(i,j) and Y(i,j) are within a threshold value of one another, and wherein C(i,j) takes on a fourth value where X(i,j) and Y(i,j) are not within the threshold value of one another; and
  based on B and C, merging the pixel values of X and Y to form an m×n tile Z, wherein Z represents a portion of the scene.

14. The article of manufacture of claim 13, wherein obtaining B comprises:
  for $0 \le i \le m$ and $0 \le j \le n$, setting B(i,j) to the first value where the one or more pixel values of X(i,j) are less than a blend map threshold value, and setting B(i,j) to the second value where the one or more pixel values of X(i,j) are greater than or equal to the blend map threshold value.

15. The article of manufacture of claim 13, wherein obtaining C comprises:
  for $0 \le i \le m$ and $0 \le j \le n$, setting C(i,j) to the third value where X(i,j) and Y(i,j) are within the threshold value of one another, and setting C(i,j) to the fourth value where X(i,j) and Y(i,j) are not within the threshold value of one another.

16. The article of manufacture of claim 13, wherein merging the pixel values of X and Y to form Z comprises:
  setting B(i,j) to the second value where B(i,j) is the first value, C(i,j) is the fourth value, and at least one adjacent neighbor to B(i,j) in B is the second value;
  setting Z(i,j) to X(i,j) where B(i,j) is the first value; and
  setting Z(i,j) to Y(i,j) where B(i,j) is the second value.

17. A computing device comprising:
  at least one processor;
  data storage; and
  program instructions, stored in the data storage, that upon execution by the at least one processor cause the computing device to perform operations including:
    obtaining a base m×n tile, X, of a base image of a scene, and an alternate m×n tile, Y, of an alternate image of the scene, wherein X(i,j) represents one or more pixel values of X indexed by i and j, and wherein Y(i,j) represents one or more pixel values of Y indexed by i and j, wherein X and Y have been aligned with one another;
    obtaining an m×n blend map, B, for X and Y, wherein B(i,j) takes on a first value to refer to X(i,j), and wherein B(i,j) takes on a second value to refer to Y(i,j);
    obtaining an m×n conflict map, C, for X and Y, wherein C(i,j) takes on a third value where X(i,j) and Y(i,j) are within a threshold value of one another, and wherein C(i,j) takes on a fourth value where X(i,j) and Y(i,j) are not within the threshold value of one another; and
    based on B and C, merging the pixel values of X and Y to form an m×n tile Z, wherein Z represents a portion of the scene.

18. The computing device of claim 17, wherein obtaining B comprises:
  for $0 \le i \le m$ and $0 \le j \le n$, setting B(i,j) to the first value where the one or more pixel values of X(i,j) are less than a blend map threshold value, and setting B(i,j) to the second value where the one or more pixel values of X(i,j) are greater than or equal to the blend map threshold value.

19. The computing device of claim 17, wherein obtaining C comprises:
  for $0 \le i \le m$ and $0 \le j \le n$, setting C(i,j) to the third value where X(i,j) and Y(i,j) are within the threshold value of one another, and setting C(i,j) to the fourth value where X(i,j) and Y(i,j) are not within the threshold value of one another.

20. The computing device of claim 17, wherein merging the pixel values of X and Y to form Z comprises:
  setting B(i,j) to the second value where B(i,j) is the first value, C(i,j) is the fourth value, and at least one adjacent neighbor to B(i,j) in B is the second value;
  setting Z(i,j) to X(i,j) where B(i,j) is the first value; and
  setting Z(i,j) to Y(i,j) where B(i,j) is the second value.

* * * * *